US009725863B2

(12) United States Patent
Izumi et al.

(10) Patent No.: US 9,725,863 B2
(45) Date of Patent: Aug. 8, 2017

(54) VERTICAL PNEUMATIC FENDER AND MONITORING METHOD FOR SAME

(71) Applicant: The Yokohama Rubber Co., LTD., Minato-ku, Tokyo (JP)

(72) Inventors: Minami Izumi, Hiratsuka (JP); Shigehiko Amano, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/026,133

(22) PCT Filed: Sep. 16, 2014

(86) PCT No.: PCT/JP2014/074392
§ 371 (c)(1),
(2) Date: Mar. 30, 2016

(87) PCT Pub. No.: WO2015/045950
PCT Pub. Date: Apr. 2, 2015

(65) Prior Publication Data
US 2016/0215467 A1    Jul. 28, 2016

(30) Foreign Application Priority Data

Sep. 30, 2013 (JP) .................................. 2013-203210
Dec. 13, 2013 (JP) .................................. 2013-257641

(51) Int. Cl.
*B63B 59/02* (2006.01)
*E02B 3/26* (2006.01)
*E02B 17/00* (2006.01)

(52) U.S. Cl.
CPC ................ *E02B 3/26* (2013.01); *B63B 59/02* (2013.01); *E02B 17/003* (2013.01); *B63B 2059/025* (2013.01)

(58) Field of Classification Search
CPC ..... B63B 59/02; B63B 2059/025; E02B 3/26; E02B 17/003
See application file for complete search history.

(56) References Cited

U.S. PATENT DOCUMENTS 3,276,414 A * 10/1966 Lee ........................... E02B 3/26
114/219
4,351,257 A * 9/1982 Brown, Jr. ................ E02B 3/26
114/219

(Continued)

FOREIGN PATENT DOCUMENTS

JP    S57-0123827    8/1982
JP    S59-183913     12/1984

(Continued)

OTHER PUBLICATIONS

International Search Report for International Application No. PCT/JP2014/074392 dated Dec. 2, 2014, 4 pages, Japan.

*Primary Examiner* — Benjamin Fiorello
(74) *Attorney, Agent, or Firm* — Thorpe North & Western

(57) ABSTRACT

A vertical pneumatic fender comprises a fender body having bowl-shaped hemispherical portions joined to both ends in the axial direction of a cylindrical body portion, and a weight that is connected to the bottom of the fender body. The vertical pneumatic fender accommodates ballast water in an interior space of the fender body, and is provided with a backup chain. One end of the backup chain is connected to the fender body in a position that is offset with respect to the axial line of the fender body, and the other end is connected to the weight. The fender body and the weight are connected with the backup chain in a sack state. The slope of an axial orthogonal reference line and an axial parallel reference line are detected by way of a reference line detector.

20 Claims, 9 Drawing Sheets

(56) References Cited

U.S. PATENT DOCUMENTS

| | | | | |
|---|---|---|---|---|
| 9,499,243 | B2* | 11/2016 | Sakakibara | E02B 17/003 |
| 2004/0011267 | A1* | 1/2004 | Kent | B63B 59/02 |
| | | | | 114/220 |
| 2013/0076536 | A1* | 3/2013 | Nakatani | G08C 17/02 |
| | | | | 340/870.02 |
| 2015/0325099 | A1* | 11/2015 | Sakakibara | G01L 5/101 |
| | | | | 340/668 |

FOREIGN PATENT DOCUMENTS

| | | | | |
|---|---|---|---|---|
| JP | S60-045732 | | 3/1985 | |
| JP | S63-019368 | | 5/1988 | |
| JP | S63-180586 | | 7/1988 | |
| JP | 2534640 | | 5/1997 | |
| JP | H09-304056 | | 11/1997 | |
| JP | H11-0117261 | | 4/1999 | |
| JP | 3185620 | | 8/2013 | |
| SE | WO 8700139 | A1 * | 1/1987 | B63B 27/14 |

* cited by examiner

VERTICAL PNEUMATIC FENDER AND MONITORING METHOD FOR SAME

TECHNICAL FIELD

The present technology relates to a vertical pneumatic fender and a monitoring method for same, and more particularly relates to a vertical pneumatic fender and a monitoring method for same that prevents a weight connected to the bottom of the fender body from dropping to the sea floor and that can ensure more stable functionality of the fender.

BACKGROUND ART

Among pneumatic fenders, there are vertical pneumatic fenders with a weight connected to the bottom of the fender body, and with a predetermined quantity of ballast water stored within an interior space (for example, see Japanese Unexamined Patent Application Publication No. H11-117261A). The vertical pneumatic fender is maintained in a stable attitude by the balance between the vertical downward force of the weight and the ballast water stored in the interior space and the buoyancy force acting on the fender body.

The weight is connected to a fitting on the bottom of the fender body either indirectly via a chain or directly using a bolt or the like. When moored in a harbor where the water is insufficient, the weight of the vertical pneumatic fender repeatedly impacts the sea floor when there are large vertical oscillations. Alternatively, when the vertical pneumatic fender is inappropriately handled such as by towing with the weight attached, an excessive external force can be applied to the chain or bolt that connects the weight to the fitting. In these cases damage can occur to the chain, the bolt, or the connector (fitting) to which these are connected, causing the problem that the weight drops to the sea floor.

The weight that has dropped to the sea floor becomes waste as it is. Also, the fender from which the weight has fallen immediately greatly loses the vertical balance, and thus it is not possible to maintain its original installed attitude. In other words, the problem occurs that the intended functionality of the fender cannot be ensured due to the vertical pneumatic fender floating in a horizontal attitude.

SUMMARY

The present technology provides a vertical pneumatic fender and a monitoring method for same that prevents a weight connected to the bottom of the fender body from dropping to the sea floor and that can ensure more stable functionality of the fender.

The vertical pneumatic fender according to the present technology includes: a fender body having bowl shaped hemispherical portions joined to both ends in the cylinder axial direction of a cylindrical body portion; and a weight that is connected to the bottom of the fender body; ballast water is accommodated in an interior space of the fender body, a backup chain is provided connected at one end thereof to the fender body and at the other end thereof to the weight, and the backup chain is connected to the fender body and the weight in a slack state.

The vertical pneumatic fender monitoring method according to the present technology is for a vertical pneumatic fender that includes a fender body having bowl shaped hemispherical portions joined to both ends in the cylinder axial direction of a cylindrical body portion, and a weight that is connected to one of the hemispherical portions of the fender body, ballast water that is accommodated in an interior space of the fender body, a backup chain that is provided connected at one end thereof to the fender body at a position that is offset with respect to an axial center line and at the other end thereof to the weight, the backup chain being connected to the fender body and the weight in a slack state, the method comprising: floating the fender body in the sea so that the weight is on the lower side of the fender body; and monitoring whether or not there is damage to the connection between the one hemispherical portion of the fender body and the weight by detecting an inclination of a reference line provided in a region above the water on the outer circumferential surface of the fender body in this attitude using a reference line detector.

According to the vertical pneumatic fender of the present technology, the backup chain is provided with one end thereof connected to the fender body and the other end thereof connected to the weight, so if the connection between the weight and one of the hemispherical portions of the fender body is broken during use of the fender, the weight is suspended from the fender body via the backup chain. Therefore, the weight can be prevented from dropping to the sea floor. In this way, the original function of the fender can be maintained and ensured.

Moreover, the backup chain is connected to the fender body and the weight in a slack state, so when the connection between the weight and one of the hemispherical portions of the fender body is normal, the backup chain does not support the mass of the weight. In other words, the backup chain first functions as a member to prevent the weight from dropping when a fault occurs and the connection between the weight and one of the hemispherical portions of the fender body is broken. Therefore degradation with time of the backup chain is reduced, which is more advantageous for ensuring the stable function of the fender.

Here, a configuration can be adopted in which one end of the backup chain is connected to the fender body at a position that is offset with respect to the axial center line. According to this configuration, when the connection between the weight and one of the hemispherical portions of the fender body is broken and the weight is suspended from the fender body via the backup chain, the fender body becomes inclined with respect to the vertical line. Therefore, it is possible to determine whether or not the connection between the weight and one of the hemispherical portions of the fender body is broken by visually checking the degree of inclination of the fender body.

A specific configuration is, for example, a configuration in which one end of the backup chain is connected to a fitting provided on one of the hemispherical portions connected to the weight. Also, a configuration in which a protective net is fitted to the outer periphery of the fender body, and one end of the backup chain is connected to the protective net can be used. Alternatively, a configuration in which a mounting chain is fitted to the outer periphery of the fender body and connected to the hemispherical portions, and one end of the backup chain is connected to the mounting chain can be used.

The offset distance between the one end of the backup chain and the axial center line may be configured to be 7% or more of the diameter of the body portion. As a result of this configuration, when the connection between the weight and one of the hemispherical portions of the fender body is broken, the inclination angle of the fender body with respect to the vertical line is increased, so it is easier to determine whether or not the connection between the weight and the lower side of the fender body has been broken.

A configuration in which an axial orthogonal reference line that can be seen and extends orthogonally to the axial center line on the outer circumferential surface of the fender body can be used. Alternatively a configuration in which a visible axial parallel reference line that orthogonally intersects with the axial orthogonal reference line and extends on the outer circumferential surface of the fender body can be used. As a result of this configuration, the extent of inclination of the fender body can be more easily checked visually.

According to the vertical pneumatic fender monitoring method of the present technology, when the connection between the lower side of the fender body of the vertical pneumatic fender and the weight is broken, the weight is suspended from the fender body via the backup chain. Here, one end of the backup chain is connected to the fender body at a position that is offset with respect to the axial center line of the fender body, so the fender body becomes inclined with respect to the vertical line. Consequently, by detecting the inclination of the reference line provided in a region above the water on the outer circumferential surface of the fender body using a reference line detector, it can be easily determined whether or not the connection between the lower side of the fender body and the weight is broken.

DETAILED DESCRIPTION

Figure 1:
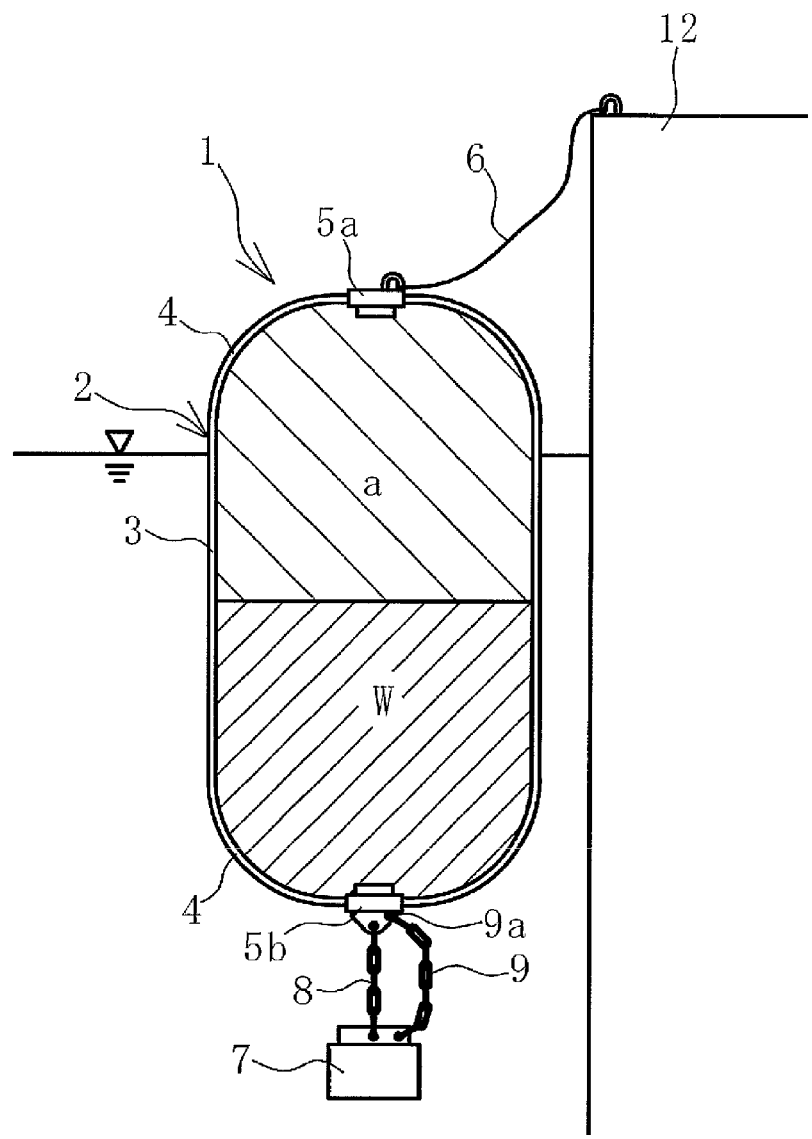
FIG. 1 is a front view illustrating an embodiment of the vertical pneumatic fender according to the present technology, with the inside of the vertical pneumatic fender visible.

The vertical pneumatic fender and the monitoring method for same according to the present technology will now be described on the basis of the embodiments illustrated in the drawings.

Figure 2:
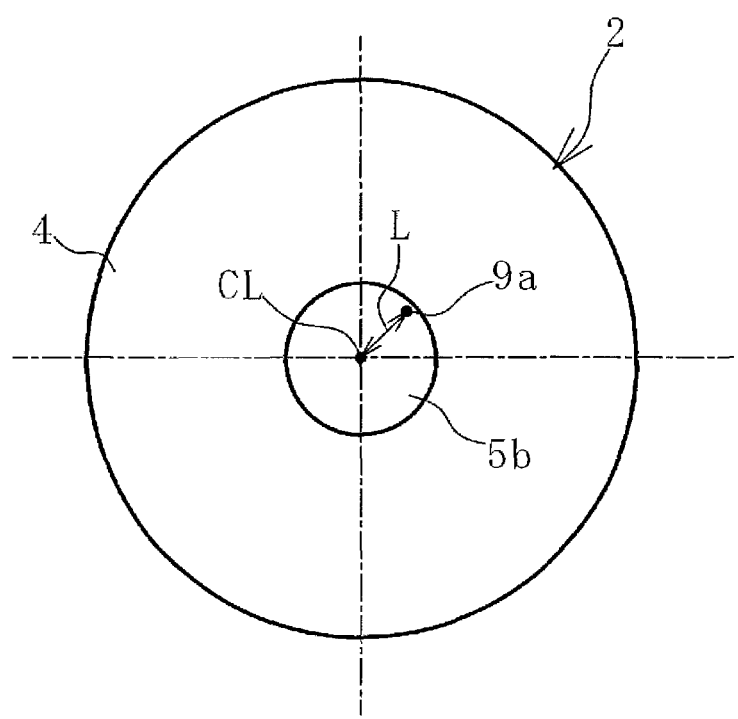
FIG. 2 is a bottom view illustrating the positional relationship between the axial center line of the fender body and one end of the main chain.

A vertical pneumatic fender 1 according to the present technology illustrated in FIGS. 1 and 2 (hereafter referred to as fender 1) includes a fender body 2 having bowl-shaped hemispherical portions 4 on both ends in the cylinder axial direction of a cylindrical shaped body portion 3, and a weight 7 connected to one of the hemispherical portions 4 of the fender body 2. In other words, when the fender body 2 is floating in the sea in an attitude in which the cylinder axial direction of the body portion 3 is vertical, the weight 7 is connected to the hemispherical portion 4 on the lower side.

The body portion 3 is configured with a plurality of reinforcing layers laminated between an inner rubber layer and an outer rubber layer. Each of the reinforcing layers is a cord layer formed with a plurality of cords arranged in parallel, the cords of reinforcing layers that are laminated adjacent to each other intersect, and are arranged at a predetermined cord angle with respect to the cylinder axial direction of the body portion 3.

Each of the hemispherical portions 4 is configured by laminating a plurality of reinforcing layers between an inner rubber layer and an outer rubber layer. The plurality of reinforcing layers is configured by alternately laminating a reinforcing layer formed from cords extending in a radial direction, and a reinforcing layer formed from cords extending in the circumferential direction. The specification of the cords of the hemispherical portions 4 is basically the same as that of the cords of the reinforcing layers of the body portion 3.

The upper hemispherical portion 4 includes a fitting 5a, and the fitting 5a is connected to one end of a guy chain 6. The other end of the guy chain 6 is fixed to an anchor or the like projecting from a quay 12. The lower hemispherical portion 4 includes a fitting 5b, and a metal main chain 8 is connected at one end thereof to the fitting 5b, and at the other end thereof to the weight 7. In other words, in the present embodiment, the lower fitting 5b is connected to the weight 7 via the main chain 8.

In addition, a metal backup chain 9 is provided connected between the fender body 2 and the weight 7. One end 9a of the backup chain 9 is connected to the fender body 2, and the other end of the backup chain 9 is connected to the weight 7. In the present embodiment, one end 9a of the backup chain 9 is connected to the fitting 5b. It is possible for the specification of the backup chain 9 to differ from that of the main chain 8 in the length only.

The backup chain 9 is connected to the fender body 2 and the weight 7 in a slack state. In other words, during normal times when the fender body 2 is being used floating in the sea and standing in the vertical attitude, the backup chain 9 does not support the weight of the weight 7, and there is no tension in the backup chain 9. The mass of the weight 7 is supported by the main chain 8, and the weight 7 is suspended from the fitting 5b via the main chain 8.

In the present embodiment, one end 9a of the backup chain 9 is connected in a position offset with respect to the cylinder center line CL (the line extending in the cylinder axial direction passing through the center of the fender body 2 in plan view) of the fender body 2. The offset distance L is set to, for example, 7% or more of the diameter of the body portion 3. More preferably the offset distance L is set to 50% or less of the diameter of the body portion 3. The diameter of the body portion 3 referred to here is the external diameter of the body portion 3 under the conditions of use in which the specified internal pressure is set in the interior space of the fender body 2. Preferably the offset distance L is 10 cm or more.

Air a and a predetermined quantity of ballast water W is contained within the interior space of the fender body 2. The specified internal pressure of the fender body 2 is, for example, about from 50 to 100 kPa. The vertical downward force due to the ballast water W and the weight 7 act on the fender body 2, and this vertical downward force is balanced by the buoyancy force acting on the fender body 2 to maintain the fender body 2 with the hemispherical portions 4 at both ends in the vertical direction. The fender 1 is only used with the fender body 2 in the vertical attitude, with boats and ships moored to the quay 12 abutting the fender body 2.

Figure 3:
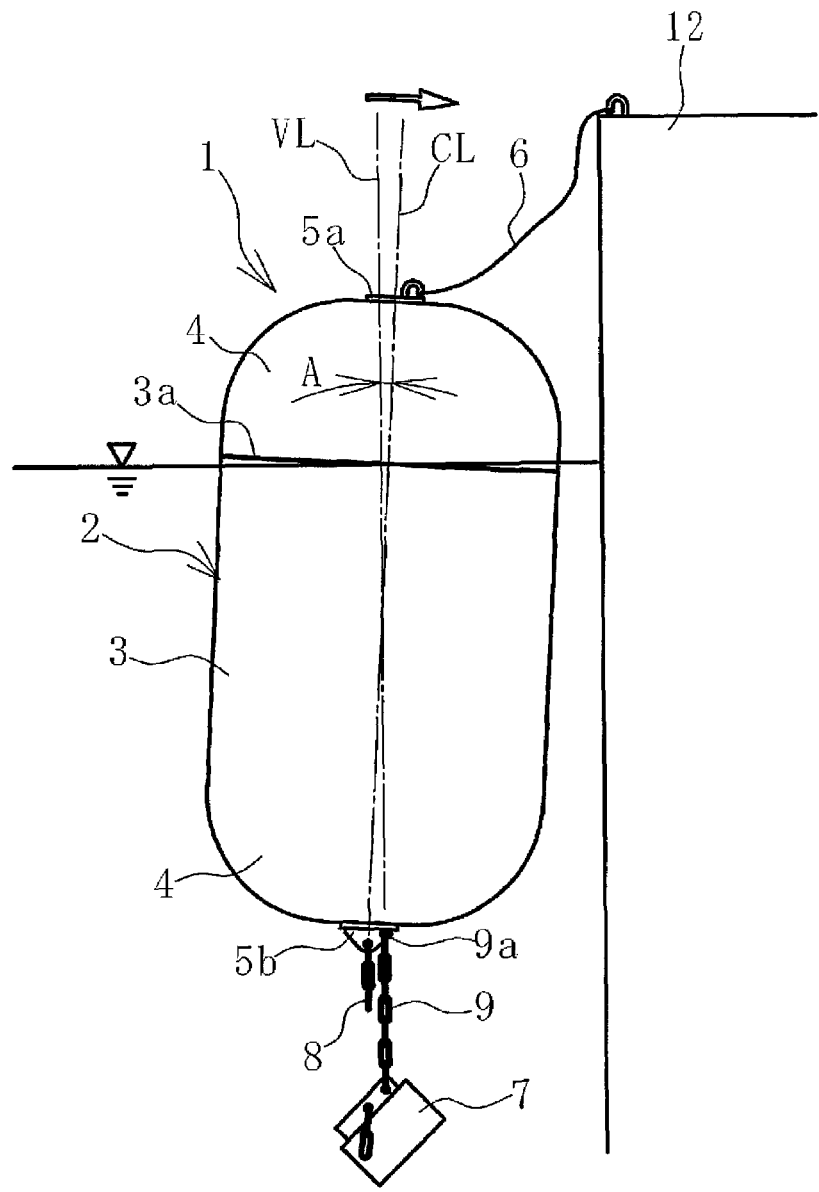
FIG. 3 is a front view illustrating the embodiment of FIG. 1 in the condition in which the main chain that is connected to the weight is broken.

According to this fender 1, the backup chain 9 is provided, so when the main chain 8 or its connector that connects the weight 7 to the lower side of the fender body 2 is broken as illustrated in FIG. 3, the weight 7 is suspended from the fender body 2 via the backup chain 9. Consequently, the weight 7 can be prevented from dropping to the sea floor. In this way, the attitude of the fender body 2 can be maintained, and the original function of the fender 1 can be maintained and ensured.

Moreover, during normal use, in other words when the main chain 8 and the connector thereof are normal, the backup chain 9 does not support the mass of the weight 7. In other words, the backup chain 9 first functions as a member to prevent dropping of the weight 7 during a fault in which the main chain 8 or the connector thereof is broken. Consequently, degradation with time of the backup chain 9 is reduced, which is more advantageous for ensuring the stable function of the fender 1.

When one end 9a of the backup chain 9 is connected to the fender body 2 at a position that is offset with respect to the cylinder center line CL, as in the present embodiment, then when the weight 7 is suspended from the fender body 2 via the backup chain 9 when the main chain 8 or the connector thereof is broken, the attitude of the fender body 2 is inclined with respect to the vertical line VL. In other words, as illustrated in FIG. 3, the axial center line CL of the fender body 2 has an inclination angle A with respect to the vertical line VL.

Therefore, by visually checking the state of inclination of the fender body 2 (whether or not it is inclined), it is possible to determine whether or not the main chain 8 or the connector thereof are broken. If the fender body 2 is inclined, it can be confirmed whether or not the main chain 8 or the connector thereof are actually broken, and if broken measures can be taken such as replacing the damaged member.

If the backup chain 9 is too long, it may frequently interfere with the main chain 8 or the weight 7, and the like. Also, when the main chain 8 or the connector thereof is broken and the mass of the weight 7 is first supported and suspended, an excessive tensile force will act on the backup chain 9. Therefore, the length of the backup chain 9 is set to, for example, 105% to 120% of the shortest length of the backup chain 9 in which a tensile force is not produced when connected to the fender body 2 and the weight 7 under normal use of the fender 1.

When the offset distance L between one end 9a of the backup chain 9 and the axial center line CL is equal to or greater than 7% of the diameter of the body portion 3, when the main chain 8 or the connector thereof is broken, the inclination angle A of the axial center line CL with respect to the vertical line VL is increased. Consequently, it becomes easy to visually check the degree of inclination of the fender body 2, and therefore it is easy to determine whether or not the main chain 8 or the connector thereof is broken.

If an axial orthogonal reference line 3a orthogonal to the axial center line CL extends on the outer circumferential surface of the fender body 2 so that it is visible, it becomes easier to visually check whether or not the fender body 2 is inclined, and therefore it is easier to determine whether or not the main chain 8 or the connector thereof is damaged. If the axial orthogonal reference line 3a is in a fluorescent color or a reflective color, the extent of inclination of the fender body 2 will be easier to visually check.

Figure 4:
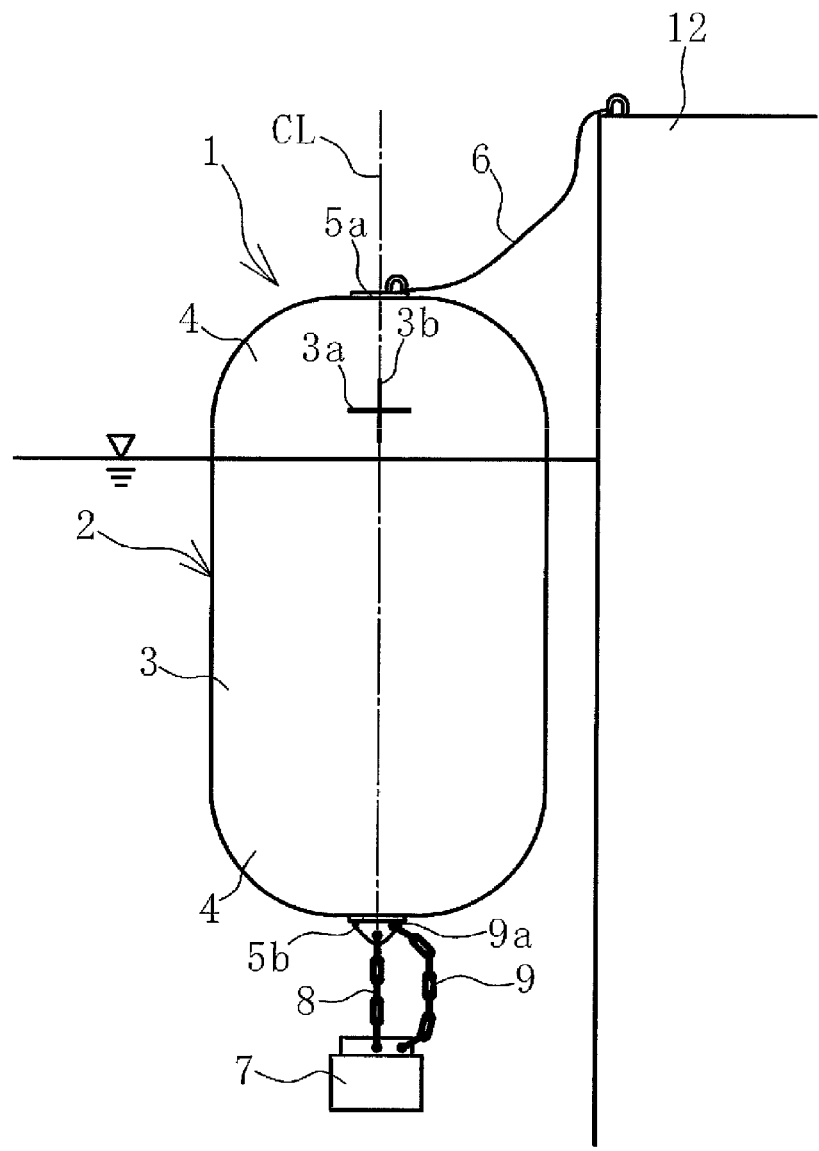
FIG. 4 is a front view illustrating another embodiment of the vertical pneumatic fender according to the present technology.

As illustrated in FIG. 4, in addition to the axial orthogonal reference line 3a, a visible axial parallel reference line 3b can be extended orthogonally intersecting the axial orthogonal reference line 3a. If the axial parallel reference line 3b is in a fluorescent color or a reflective color, it will be easier to visually check. The axial orthogonal reference line 3a and the axial parallel reference line 3b may be provided in a position above the water when the fender body 2 is floating in the sea (a position above the draft line).

Figure 5:
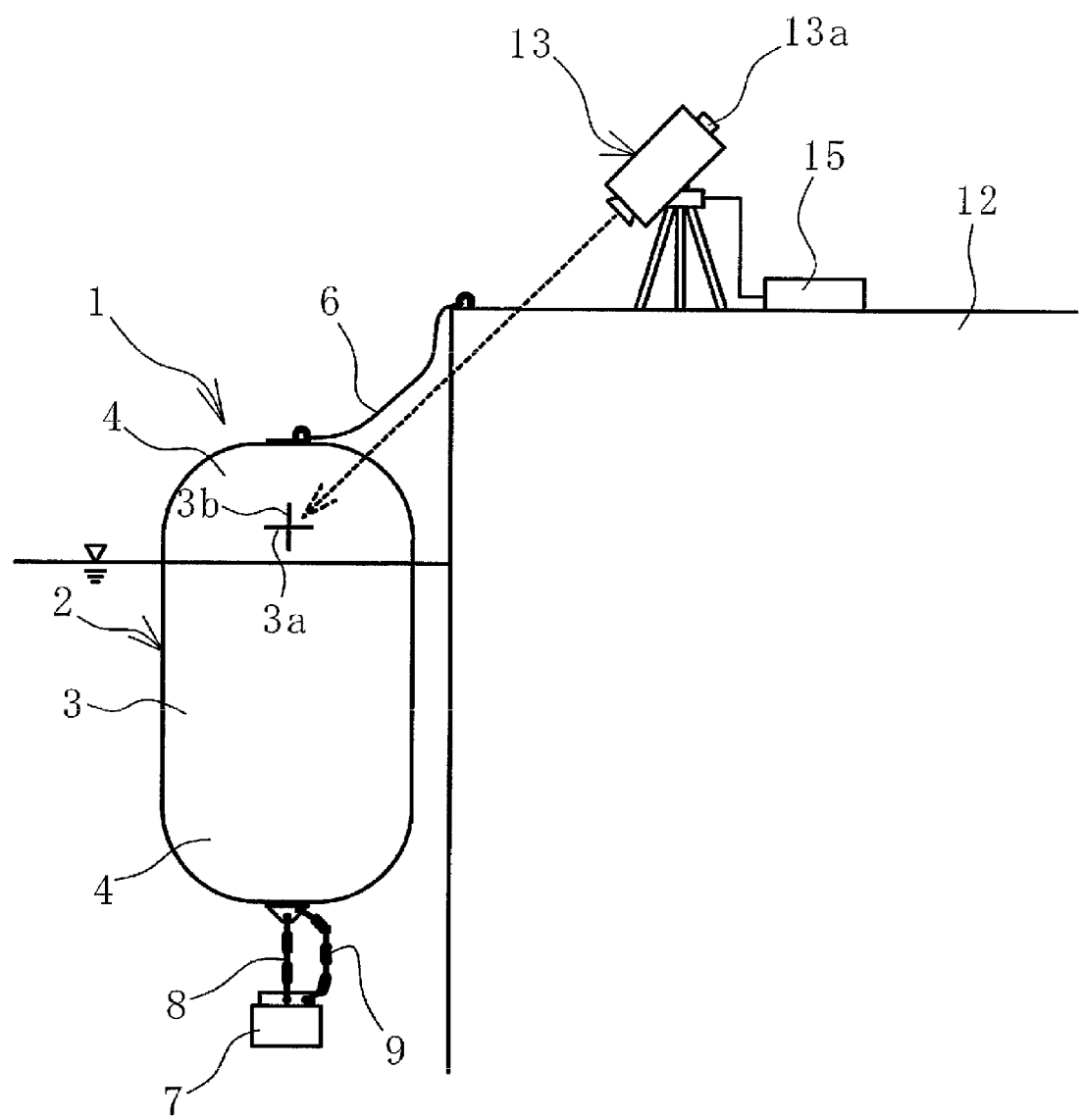
FIG. 5 is an explanatory view illustrating a monitoring system for monitoring the inclination of the vertical pneumatic fender.

A monitoring system such as, for example, illustrated in FIG. 5 can be used in monitoring the fender 1 to determine whether or not the main chain 8 or the connector thereof that are connected to the weight 7 and the lower side of the fender body 2 are broken. This monitoring system includes a reference line detector 13 installed on land, and a calculating device 15 connected to the reference line detector 13. The inclination of the axial orthogonal reference line 3a and the axial parallel reference line 3b that are provided at a region above the water on the outer circumferential surface of the fender body 2 is detected by the reference line detector 13. A level gauge or a water level or similar device can be used as the reference line detector 13.

Figure 6:
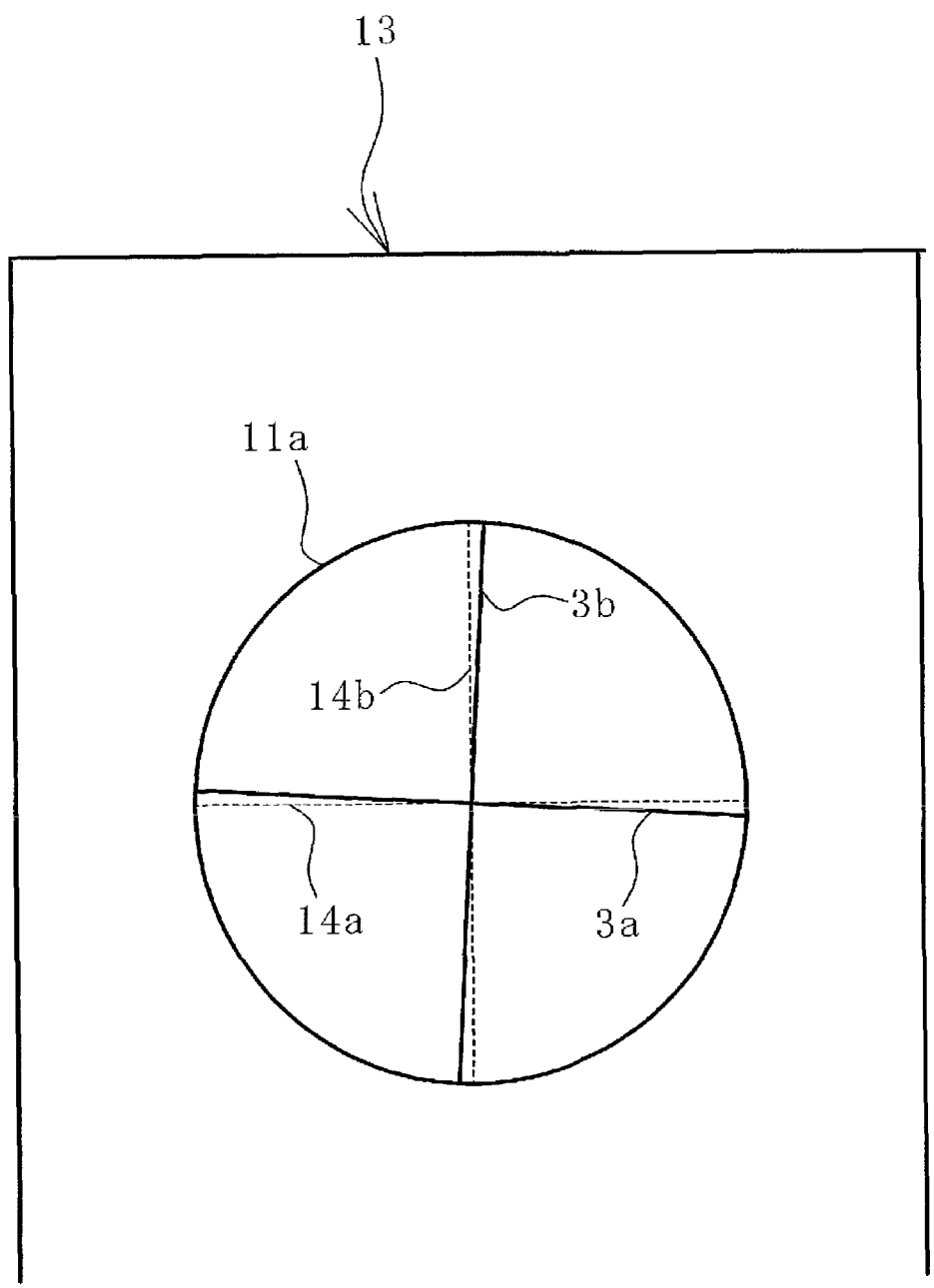
FIG. 6 is an explanatory view illustrating the condition when the vertical pneumatic fender is viewed through the finder of the reference detector of FIG. 5.

A horizontal line 14a and a vertical line 14b as illustrated in FIG. 6 are marked on a finder 13a of the reference line detector 13. When the main chain 8 or the connector thereof that connects the weight 7 and the lower side of the fender body 2 is broken, and the fender body 2 is inclined with respect to the vertical line VL, when the finder 13a is viewed and the status of the axial orthogonal reference line 3a and the axial parallel reference line 3b are checked, the horizontal line 14a and the axial orthogonal reference line 3a, and the vertical line 14b and the axial parallel reference line 3b are in a deviated state (non-parallel state). Consequently, by viewing the axial orthogonal reference line 3a or the axial parallel reference line 3b using the reference line detector 13, it can be easily determined whether or not the main chain 8 or the connector thereof is broken. A camera or the like in which the horizontal line 14a or the vertical line 14b is marked on the finder 13a thereof can be used as the reference line detector 13.

The inclination data of the axial orthogonal reference line 3a or the axial parallel reference line 3b detected by the reference line detector 13 can be configured to be input to the calculating device 15, so that the calculating device 15 determines whether or not the main chain 8 or the connector thereof is broken based on the inclination data. In this case, by configuring so that the inclination data as described above is acquired at preset time intervals, and input to the calculating device 15 to make the determination, monitoring can be automatically carried out.

Figure 7:
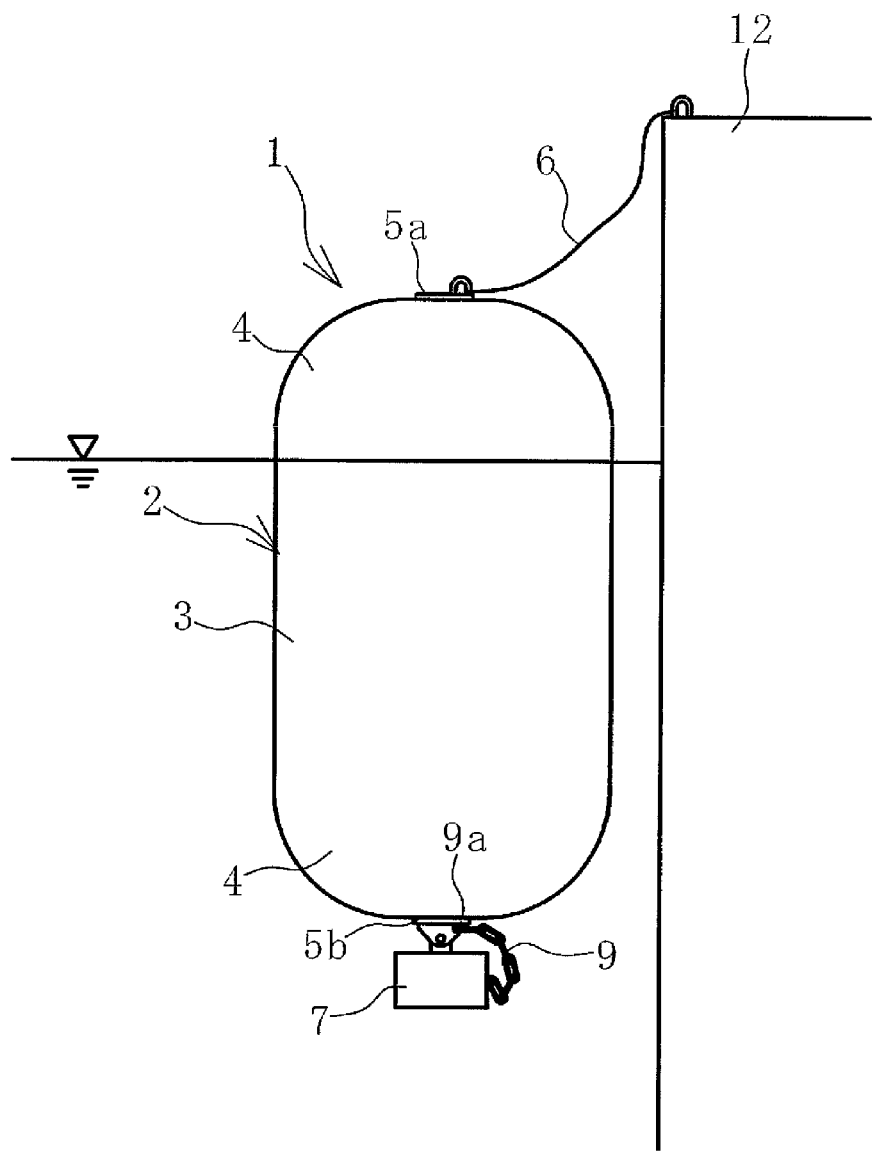
FIG. 7 is a front view illustrating another embodiment of the vertical pneumatic fender according to the present technology.
Figure 8:
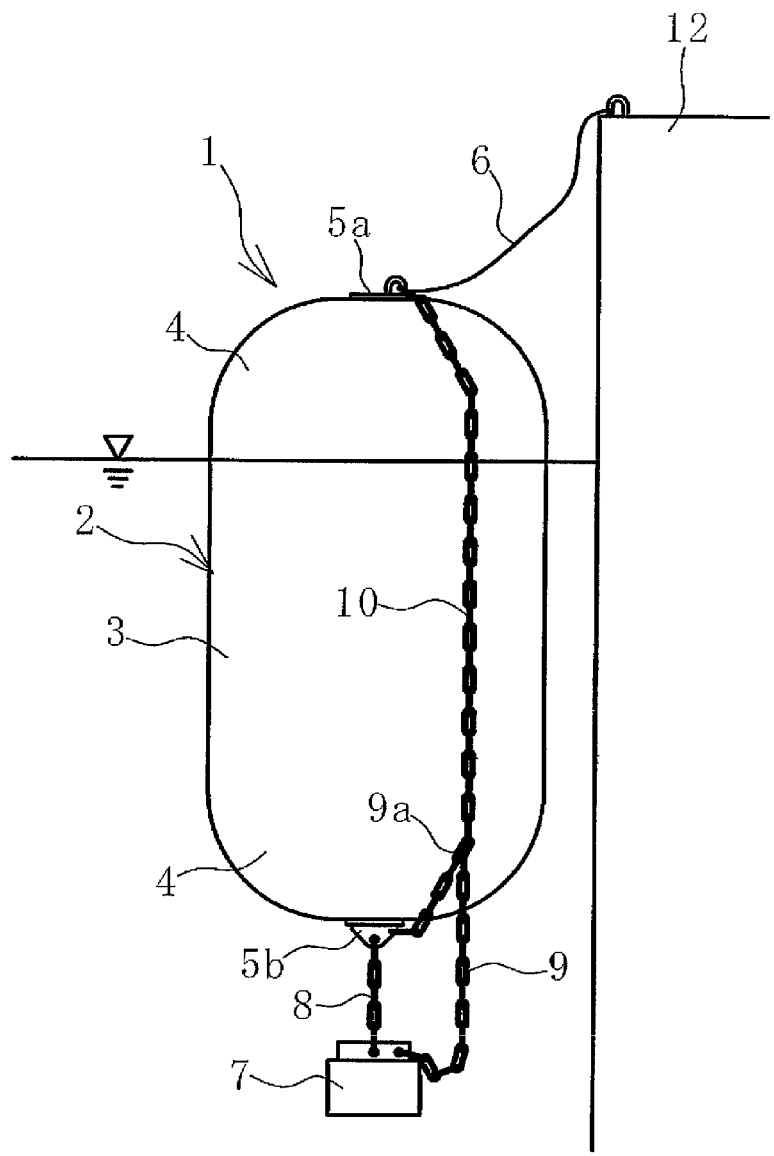
FIG. 8 is a front view illustrating another embodiment of the vertical pneumatic fender according to the present technology.

The backup chain 9 can be provided not only to the fender 1 in which the weight 7 is connected to the lower side of the fitting 5b by the main chain 8 as described for the embodiment, but also to a fender 1 in which the weight 7 is directly connected to the lower side of the connector 5b by a bolt or the like as illustrated in FIG. 7.

In the embodiment described, one end 9a of the backup chain 9 is connected to the lower side connector 5b, so it is difficult to ensure a large offset distance L between the one end 9a and the axial center line CL. Therefore, in order to increase the offset distance L, a mounting chain 10 is fitted along the outer circumferential surface of the fender body 2 connected to the fitting 5a of the upper side hemispherical portion 4 and the fitting 5b of the lower side hemispherical portion 4. Then, one end 9a of the backup chain 9 is connected to the mounting chain 10.

In this way, the offset distance L can be greatly increased to about the radius of the body portion 3. In other words, when one end 9a of the backup chain 9 is connected to the mounting chain 10 at a position on the body portion 3, the offset distance L is a maximum. When the offset distance L is increased, the inclination angle A of the axial center line CL with respect to the vertical line VL is greatly increased when the main chain 8 or the connector thereof is broken. Accordingly the extent of inclination of the fender body 2 is increased, visual checking becomes easier, and therefore it is easier to determine whether or not the main chain 8 or the connector thereof is broken.

Figure 9:
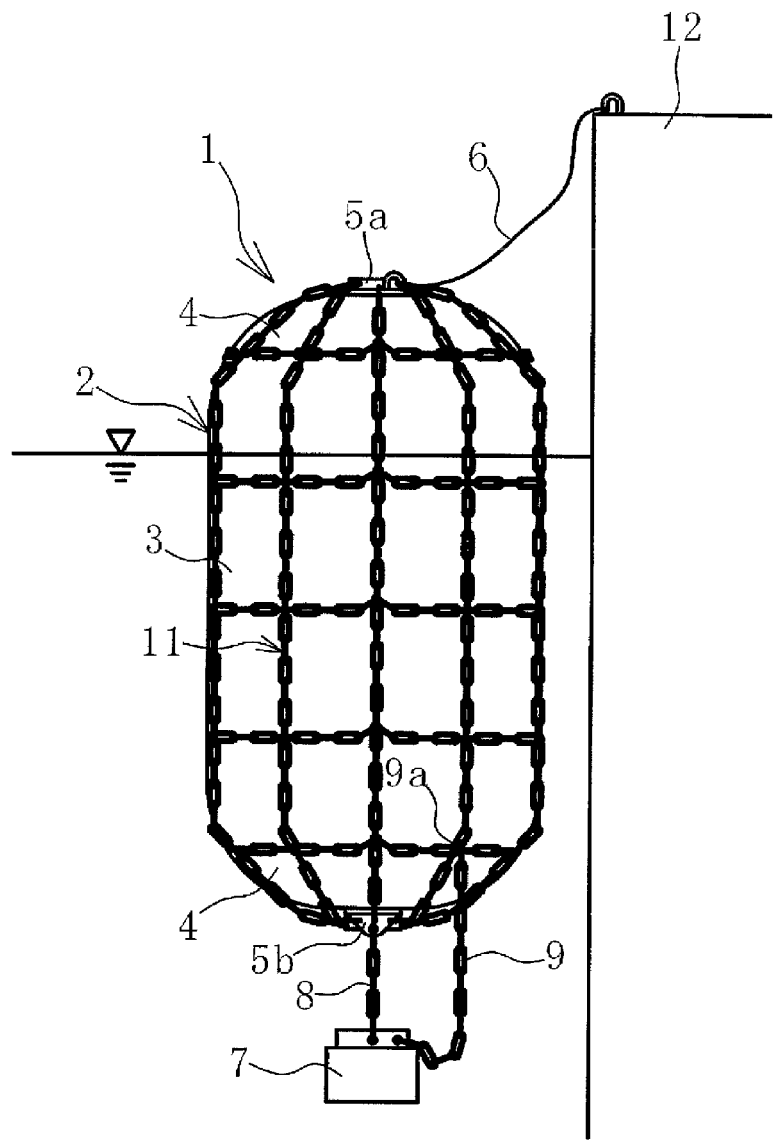
FIG. 9 is a front view illustrating another embodiment of the vertical pneumatic fender according to the present technology.

In order to increase the offset distance L, a protective net 11 is fitted around the outer periphery of the fender body 2, as in the embodiment illustrated in FIG. 9. The protective net 11 is configured from, for example, a combination of a plurality of metal vertical direction chains that extend in the cylinder axial direction at equal intervals in the circumferential direction of the fender body 2, and a plurality of metal circumferential direction chains that extend in the circumferential direction at equal intervals in the cylinder axial direction. One end 9a of the backup chain 9 is connected to the protective net 11.

In this way the offset distance L can be increased up to the maximum, or about the radius of the body portion 3. In other words, if one end of the backup chain 9 is connected to the protective net 11 at the position of the body portion 3, the offset distance L is the maximum. Accordingly, when the main chain 8 or the connector thereof is broken, the inclination angle A is increased. Consequently, the degree of inclination of the fender body 2 is increased, visual checking is made easier, and therefore it is significantly easier to determine whether or not the main chain 8 or the connector thereof is broken. In the present embodiment, by fitting the protective net 11, it becomes more difficult for the outer circumferential surface of the fender body 2 to directly contact the quay 12 or boats and ships, so there is also the effect that damage to the fender body 2 can be reduced.

The invention claimed is:

1. A vertical pneumatic fender, comprising:
a fender body having bowl shaped hemispherical portions joined to both ends in a cylinder axial direction of a cylindrical body portion;
a weight that is connected to a hemispherical portion on one side of the fender body;
ballast water that is accommodated in an interior space of the fender body; and
a backup chain provided connected at one end thereof to the fender body and at another end thereof to the weight,
the backup chain being connected to the fender body and the weight in a slack state.

2. The vertical pneumatic fender according to claim 1, wherein the one end of the backup chain is connected to the fender body at a position that is offset with respect to an axial center line.

3. The vertical pneumatic fender according to claim 2, wherein the one end of the backup chain is connected to a fitting provided on the hemispherical portion to which the weight is connected.

4. The vertical pneumatic fender according to claim 3, wherein an offset distance between the one end of the backup chain and the axial center line is not less than 7% of a radius of the body portion.

5. The vertical pneumatic fender according to claim 3, wherein an axial orthogonal reference line that can be seen extends orthogonally to the axial center line on an outer circumferential surface of the fender body.

6. The vertical pneumatic fender according to claim 5, wherein an axial parallel reference line that orthogonally intersects with the axial orthogonal reference line and can be seen extends on the outer circumferential surface of the fender body.

7. The vertical pneumatic fender according to claim 2, wherein a protective net is fitted to an outer periphery of the fender body, and the one end of the backup chain is connected to the protective net.

8. The vertical pneumatic fender according to claim 7, wherein an offset distance between the one end of the backup chain and the axial center line is not less than 7% of a radius of the body portion.

9. The vertical pneumatic fender according to claim 7, wherein an axial orthogonal reference line that can be seen extends orthogonally to the axial center line on an outer circumferential surface of the fender body.

10. The vertical pneumatic fender according to claim 9, wherein an axial parallel reference line that orthogonally intersects with the axial orthogonal reference line and can be seen extends on the outer circumferential surface of the fender body.

11. The vertical pneumatic fender according to claim 2, wherein a mounting chain is fitted to an outer periphery of the fender body and connected to each of the hemispherical portions, and the one end of the backup chain is connected to the mounting chain.

12. The vertical pneumatic fender according to claim 11, wherein an offset distance between the one end of the backup chain and the axial center line is not less than 7% of a radius of the body portion.

13. The vertical pneumatic fender according to claim 11, wherein an axial orthogonal reference line that can be seen extends orthogonally to the axial center line on an outer circumferential surface of the fender body.

14. The vertical pneumatic fender according to claim 13, wherein an axial parallel reference line that orthogonally intersects with the axial orthogonal reference line and can be seen extends on the outer circumferential surface of the fender body.

15. The vertical pneumatic fender according to claim 2, wherein an offset distance between the one end of the backup chain and the axial center line is not less than 7% of a radius of the body portion.

16. The vertical pneumatic fender according to claim 15, wherein an axial orthogonal reference line that can be seen extends orthogonally to the axial center line on an outer circumferential surface of the fender body.

17. The vertical pneumatic fender according to claim 16, wherein an axial parallel reference line that orthogonally intersects with the axial orthogonal reference line and can be seen extends on the outer circumferential surface of the fender body.

18. The vertical pneumatic fender according to claim 2, wherein an axial orthogonal reference line that can be seen extends orthogonally to the axial center line on an outer circumferential surface of the fender body.

19. The vertical pneumatic fender according to claim 18, wherein an axial parallel reference line that orthogonally intersects with the axial orthogonal reference line and can be seen extends on the outer circumferential surface of the fender body.

20. A vertical pneumatic fender monitoring method for a vertical pneumatic fender that includes
- a fender body having bowl shaped hemispherical portions joined to both ends in a cylinder axial direction of a cylindrical body portion, and
- a weight that is connected to one of the hemispherical portions of the fender body,
- ballast water that is accommodated in an interior space of the fender body, and
- a backup chain that is provided connected at one end thereof to the fender body at a position that is offset with respect to an axial center line and at another end thereof to the weight,
- the backup chain being connected to the fender body and the weight in a slack state, the method comprising the steps of:
- floating the fender body in the sea so that the weight is on lower side of the fender body; and
- monitoring whether or not there is damage to a connection between the one hemispherical portion of the fender body and the weight by detecting an inclination of a reference line provided in a region above the water on an outer circumferential surface of the fender body in this attitude using a reference line detector.

* * * * *